(12) United States Patent
Wu et al.

(10) Patent No.: US 8,547,789 B2
(45) Date of Patent: Oct. 1, 2013

(54) METHOD FOR GAS ZONE DETECTION USING SONIC WAVE ATTRIBUTES

(75) Inventors: Peter T. Wu, Missouri City, TX (US); Alain Dumont, Kawasaki (JP); Pierre Campanac, Sugar land, TX (US); David Linton Johnson, Somerville, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1412 days.

(21) Appl. No.: 11/964,731

(22) Filed: Dec. 27, 2007

(65) Prior Publication Data
US 2009/0168595 A1 Jul. 2, 2009

(51) Int. Cl.
*G01V 1/48* (2006.01)

(52) U.S. Cl.
USPC ................................. 367/31; 367/34

(58) Field of Classification Search
USPC .................. 73/152; 166/66, 250.07; 367/28, 367/30, 31, 32, 46, 47, 62, 63, 75; 702/6, 702/9
See application file for complete search history.

(56) References Cited

U.S. PATENT DOCUMENTS

| | | | | |
|---|---|---|---|---|
| 4,449,208 A | * | 5/1984 | Moeckel et al. | 367/30 |
| 4,561,074 A | * | 12/1985 | Warmack | 367/46 |
| 4,594,691 A | | 6/1986 | Kimball et al. | |
| 4,858,200 A | * | 8/1989 | Goins | 367/75 |
| 4,964,101 A | * | 10/1990 | Liu et al. | 367/31 |
| 5,278,805 A | | 1/1994 | Kimball | |
| 5,594,706 A | | 1/1997 | Shenoy et al. | |
| 6,957,572 B1 | | 10/2005 | Wu | |
| 7,334,651 B2 | | 2/2008 | Wu | |
| 2003/0058739 A1 | | 3/2003 | Hsu et al. | |
| 2004/0162676 A1 | * | 8/2004 | Thomann et al. | 702/9 |
| 2006/0016592 A1 | * | 1/2006 | Wu | 166/250.07 |
| 2006/0062081 A1 | | 3/2006 | Wu et al. | |
| 2006/0120217 A1 | | 6/2006 | Wu | |
| 2006/0235617 A1 | * | 10/2006 | Sinha et al. | 702/6 |
| 2007/0097786 A1 | | 5/2007 | Wu et al. | |

FOREIGN PATENT DOCUMENTS

WO WO 2004/095077 A 11/2004
WO WO 2005/052639 A1 6/2005

OTHER PUBLICATIONS

Carmichael, Robert. S., Ph.D., "Handbook of Physical Properties of Rocks" vol. II, CRC Press, Inc., Boca Raton, Florida, 1982, pp. 142-143.
Kimball, C.V., Geophysics, vol. 63 No. 2, Mar.-Apr. 1998 "Shear slowness measurement by dispersive processing of the borehole flexural mode", p. 337-344.
Biot, M.A. "Theory of Propagation of Elastic Waves in a Fluid-Saturated Porous Solid, I. Low-Frequency Range", J. Acoust. Soc. Am., 28, pp. 168-178, (1956a).
Biot, M.A., "Theory of Propagation of Elastic Waves in a Fluid-Saturated Porous Solid, II. Higher Frequency Range", J. Acoust. Soc. Am., 28, pp. 179-191. (1956b).

(Continued)

*Primary Examiner* — Isam Alsomiri
*Assistant Examiner* — Daniel L Murphy
(74) *Attorney, Agent, or Firm* — Jianguang Du; Jody DeStefanis

(57) ABSTRACT

A method for determining on a real time logging while drilling (LWD) basis gas within earth formations traversed by a borehole. Continuous LWD acoustic measurements are recorded and processed including coherent energy and attenuation attributes to detect downhole gas zones and kick during drilling operations.

11 Claims, 8 Drawing Sheets

(56) References Cited

OTHER PUBLICATIONS

Hauer, J.F. et al "Initial Results in Prony Analysis of Power System Response Signals". IEEE Transactions on Power Systems, vol. 5, No. 1, pp. 80-89, Feb. 1990.

S. Chopra, K.J. Marfurt,: "Seismic attributes for fault / fracture characterization", SEG/Annual Meeting San Antonio—Proceedings, Nov. 2007, pp. 1520-1524.

T. Chichinina, V. Sabinin, G. Ronquillo-Jarillo: "QVOA analysis: P-wave attenuation anisotropy for fracture characterization", Geophysics, Society of Exploration Geophysicists, Tulsa, Ok, US, vol. 71, No. 3, May 1, 2006, pp. C37-C48.

Y. Singh, "Lithofacies detection through simultaneous inversion and principal component attributes", Leading Edge, The, Society of Exploration Geophysicists, Tulsa, OK, US, vol. 26, No. 12, Dec. 1, 2007, pp. 1568-1574.

G. Goloshubin, D. Silin, "Using frequency-dependent seismic attributes in imaging of a fractured reservoir zone", SEG/Annual Meeting Houston—Proceedings, Nov. 2005, pp. 1417-1422.

Rosenbaum in "Synthetic Microseismograms: Logging in Porous Formations", Geophysics, vol. 39, No. 1, (Feb. 1974), pp. 14-32.

Kimball et al. "Semblance Processing of Borehole Acoustic Array Data," Geophysics, vol. 49, No. 3 (Mar. 1984), pp. 274-281.

Theodoros Klimentos, "Attenuation of P- and S-waves as a method of distinguishing gas and condensate from oil and water", Geophysics, vol. 60, No. 2 (Mar.-Apr. 1995); p. 447-458, 13 Figs.

A. Brie, F. Pampuri, A.F. Marsala, O. Meazza "Shear Sonic Interpretation in Gas-Bearing Sands" SPE 30595, Copyright 1995, Society of Petroleum Engineers, Inc., SPE Annual Technical Conference & Exhibition held in Dallas, U. S.A., Oct. 22-25, 1995.

Chuen Hon Cheng, M. Nafi Toksoz, and Mark E. Willis "Determination of in Situ Attenuation From Full Waveform Acoustic Logs" Journal of Geophysical Research, vol. 87, No. B7, pp. 5477-5484, Jul. 10, 1982.

* cited by examiner

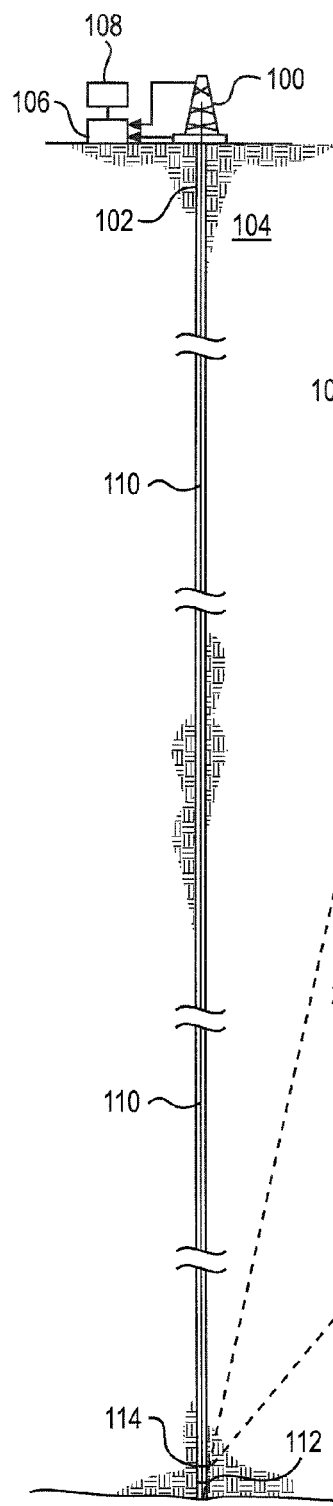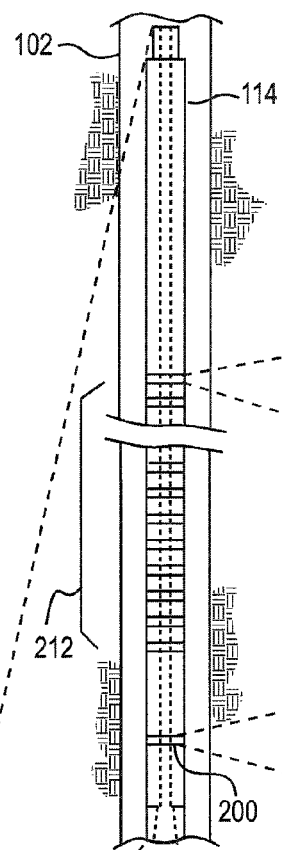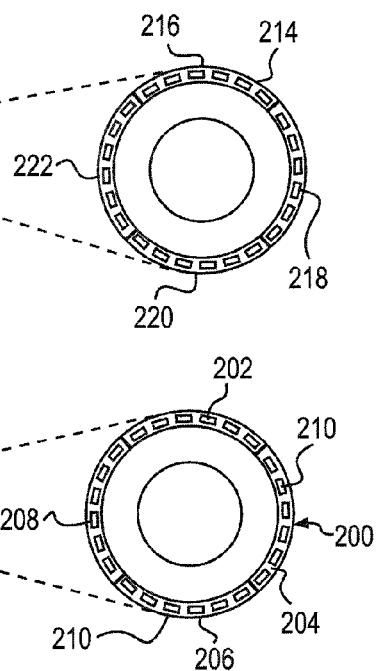
FIG. 2a
PRIOR ART
FIG. 2c
PRIOR ART
FIG. 2b
PRIOR ART
FIG. 1
PRIOR ART

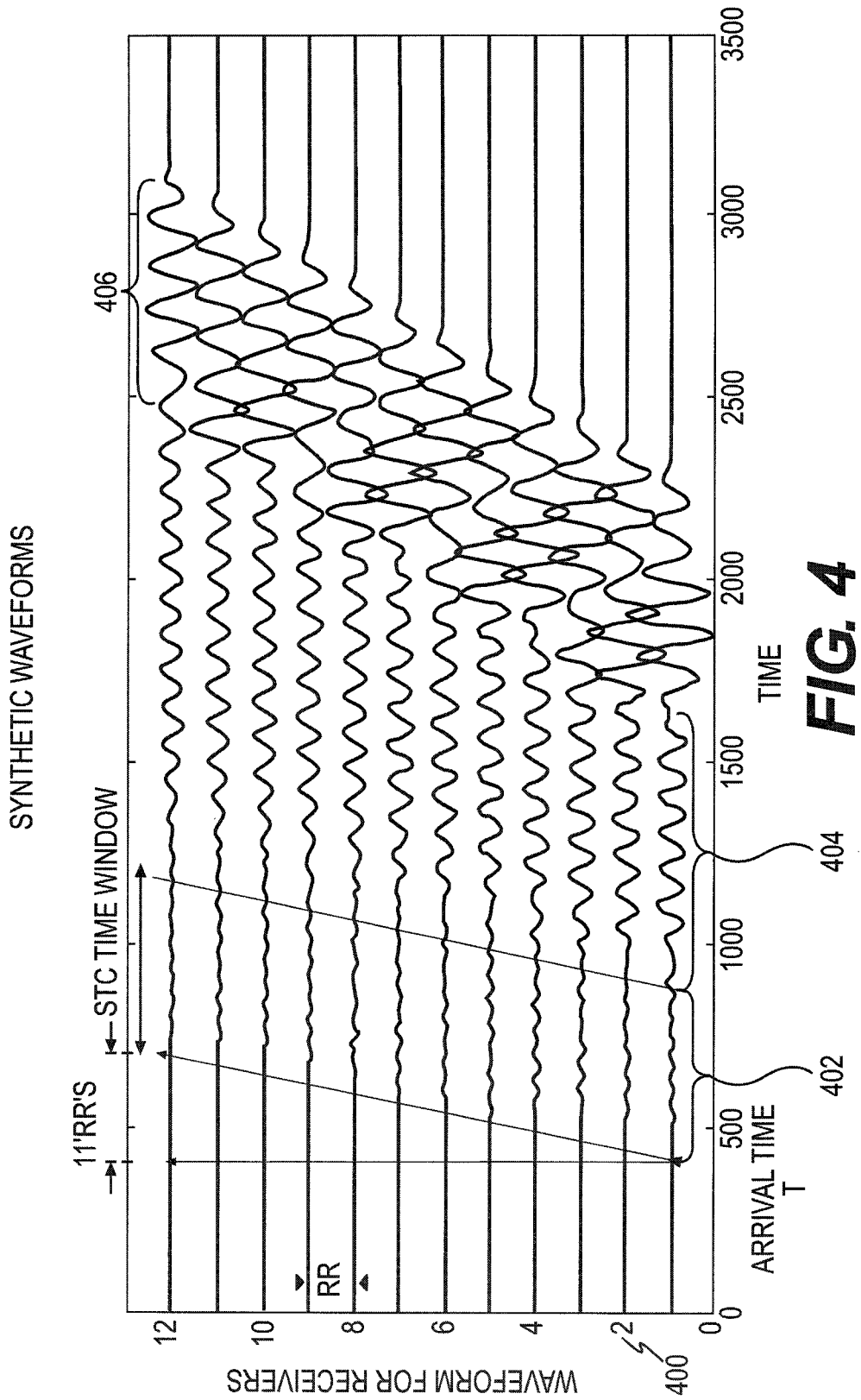

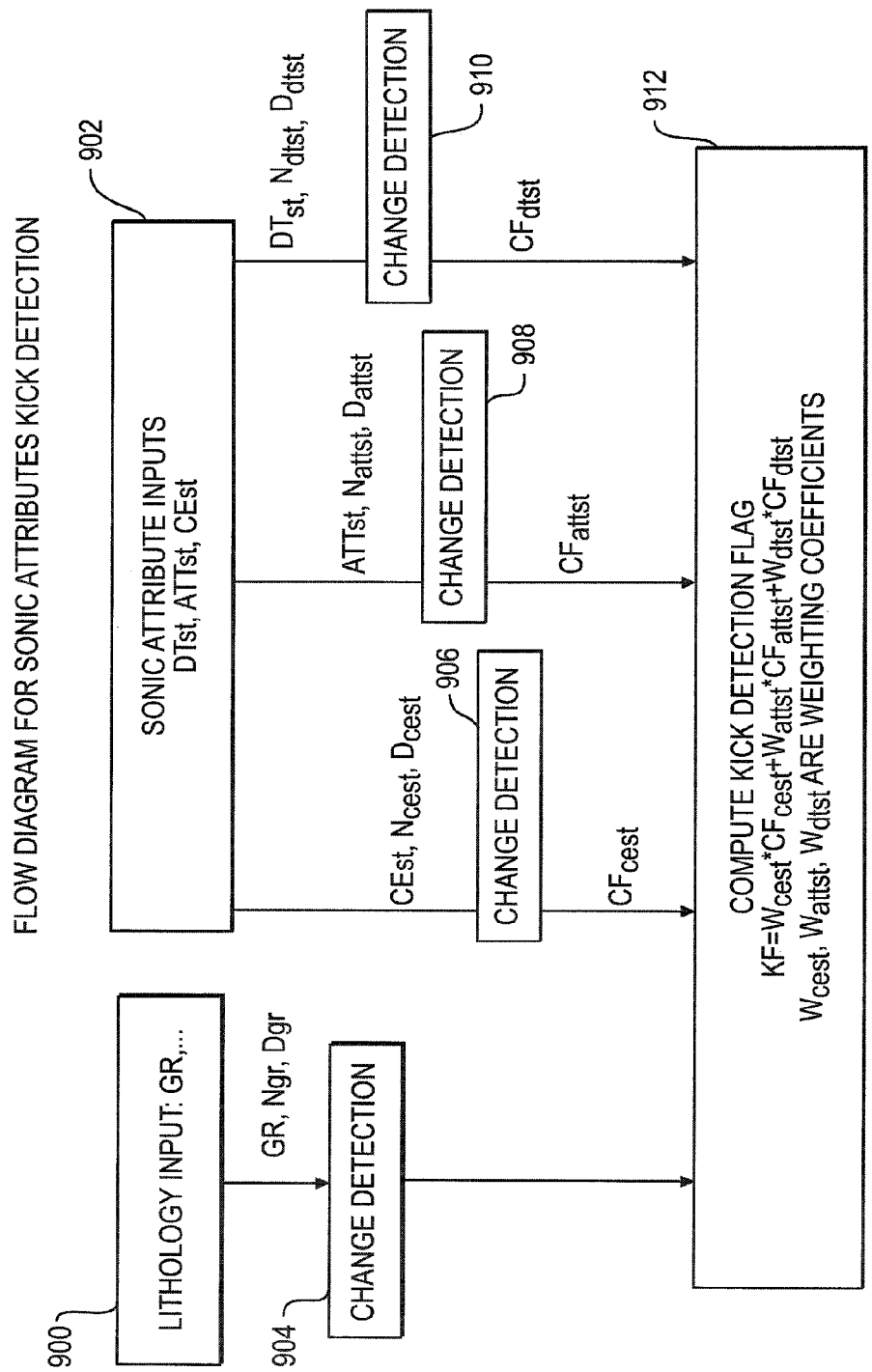

METHOD FOR GAS ZONE DETECTION USING SONIC WAVE ATTRIBUTES

TECHNICAL FIELD

This invention relates to wireline and logging-while-drilling measurement of sonic wave component attributes and use of that information for determining gas zones within a formation and/or kick detection. More specifically, this invention is directed to determining traditional compressional slowness (DTc), shear slowness (DTs) and Stoneley slowness (DTst) and in addition determining attributes of coherent energy (CE) and attenuation (ATT) for use in detecting the real time presence of gas in a formation and/or kick detection.

BACKGROUND OF THE INVENTION

In the oil and gas industry acoustic tools are used to provide operationally significant information about borehole and formation attributes adjacent the tools such as compressional, shear and Stoneley slowness. These attributes are analyzed for determining, inter alia, the rate of flow of a hydrocarbon (gas or oil) out of a producing borehole in the hydrocarbon production industry. This critical information fundamentally depends on permeability of the formation, viscosity of the hydrocarbon and the existence of fractures. Collecting and recording this information on a delayed or real time basis is known as well logging.

Evaluation of physical properties such as pressure, temperature and wellbore trajectory in three-dimensional space and other borehole characteristics while extending a wellbore is known as measurements-while-drilling (MWD) and is standard practice in many drilling operations. MWD tools that measure formation parameters such as resistivity, porosity, sonic velocity, gamma ray, etc. of a formation are known as logging-while-drilling (LWD) tools. An essential formation parameter for determination in a drilling operation is the existence of gas deposits or zones in a formation, on a real time basis. Similarly, early detection of kick is essential information for conducting safe and efficient drilling operations.

For the above and other reasons, the oil industry has developed acoustic well logging techniques that involve placing an acoustic tool within a well bore to make measurements indicative of formation attributes such as compressional slowness (DTc), shear slowness (DTs) and Stoneley slowness (DTst). Sonic logs can be used as direct indications of subsurface properties and in combination with other logs and knowledge of subsurface properties can be used to determine subsurface parameters, such as those related to borehole structure stability, that can not be measured directly. Early efforts in this connection were reported by Rosenbaum in "Synthetic Microseismograms: Logging in Porous Formations", *Geophysics*, Vol. 39, No. 1, (February 1974) the disclosure of which is incorporated by reference as though set forth at length.

Acoustic logging tools typically include a transmitter and an array of axially spaced acoustic detectors or receivers. These tools are operable to detect, as examples, formation compressional waves (P), formation shear waves (S) and Stoneley waves. These measurements can be performed following drilling or intermediate drill string trips by wireline logging operations. In wireline logging, sonic monopole tools can be used to measure compression waves (P) and shear waves (S) in fast formations. In addition to wireline logging, techniques have been developed where piezoelectric transmitters and hydrophone receivers are imbedded within the walls of drill string segments so that sonic LWD operations can be performed.

Early wireline and LWD and sonic data processing techniques developed by the Schlumberger Technology Corporation such as a slowness-time-coherence (STC) method is disclosed in U.S. Pat. No. 4,594,691 to Kimball et al. entitled "Sonic Well Logging" as well as in Kimball et al. "Semblance Processing of Borehole Acoustic Array Data," *Geophysics*, Vol. 49, No. 3 (March 1984). This method is most useful for non-dispersive waveforms (e.g. monopole compressional and shear head waves). For processing dispersive waveforms a dispersive slowness-time-coherence (DSTC) is preferred. This process is disclosed in U.S. Pat. No. 5,278,805 to Kimball entitled "Sonic Well Logging Methods and Apparatus Utilizing Dispersive Wave Processing." The disclosures of these patents, of common assignment with the subject application, as well as the noted *Geophysics* publication authored by an employee of Schlumberger are hereby also incorporated by reference.

Sonic wireline tools, such as a Dipole Shear Sonic Imager (DSI—trademark of Schlumberger) and Schlumberger's Sonic Scanner generally have a multi-pole source. A multi-pole source may include monopole, dipole and quadrupole modes of excitation. The monopole mode of excitation is used traditionally to generate compressional and shear head waves in logging operations such that formation compressional and shear slowness logs can be obtained by processing the head wave components. The head wave components are non-dispersive and are generally processed by slowness-time-coherence (STC) methods as discussed in the Schlumberger Kimball et al. '691 patent and Vol. 49 *Geophysics* article noted above.

The slowness-time-coherence (STC) method is employed to process the monopole wireline or LWD sonic waveform signals for coherent arrivals, including the formation compressional, shear and borehole Stoneley waves. This method systematically computes the coherence (C) of the signals in time windows which start at a given time (T) and have a given window move-out slowness (S) across the array. The 2D plane C(S,T) is called the slowness-time-plane (STP). All the coherent arrivals in the waveform will show up in the STP as prominent coherent peaks. The compressional, shear and Stoneley slowness (DTc, DTs, and DTst) will be derived from the attributes of these coherent peaks.

Traditionally, the attributes associated with the wave components found in the STP are the slowness, time and the peak coherence values. These three attributes are used in a labeling algorithm, discussed below, to determine the compressional, shear and Stoneley slowness from all of the STP peak candidates. These attributes can also be used for quality control purposes.

Although determining traditional attributes has been highly effective in the past a need exists for enhancing information that can be determined from traditional wave form attributes and determining additional attributes such as coherent energy and attenuation that can be used to determine the existence of a gas zone and/or kick detection, on a real time basis, during LWD operations.

SUMMARY OF THE INVENTION

The methods of the subject invention includes the slowness, time, coherence attributes and in addition the attributes of coherent energy and attenuation. The combination of these attributes can be advantageously used for detecting with well logging and logging while drilling operations formation gas zones and kick detection on a real time basis.

THE DRAWINGS

Other aspects of the present invention will become apparent from the following detailed description of embodiments taken in conjunction with the accompanying drawings.

FIG. 1 is a schematic of a typical derrick and a logging-while-drilling (LWD) system where a drill string is positioned within a borehole and a well logging segment near a drill bit is shown within a borehole;

FIG. 2a is an enlarged diagram of a logging tool within a borehole taken at a location above a drill bit within a borehole of FIG. 1;

FIG. 2b is a schematic cross-sectional view of a quadrupole sonic transmitter taken from the LWD segment shown in FIG. 2a.

FIG. 2c is a schematic cross-sectional view of a quadrupole receiver from a stack of receivers of the LWD tool shown in FIG. 2a;

FIG. 4 is a synthetic waveform illustrating waveform attribute computation;

FIG. 9 is a flow diagram for sonic attributes kick detection within a bore hole in accordance with another embodiment of the invention.

DETAILED DESCRIPTION

Figure 3:
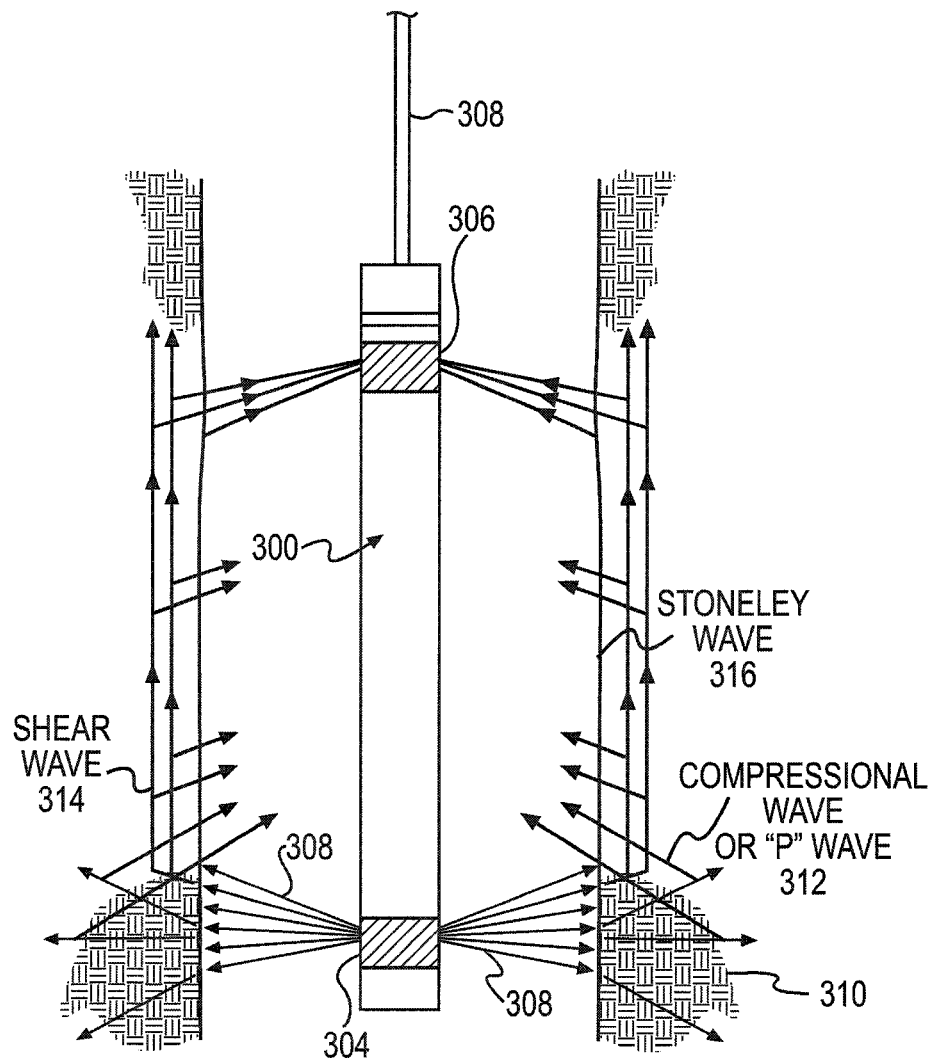
FIG. 3 is a schematic diagram disclosing traditional sonic wave technology including a representative transmitter, receiver and compressional waves, shear waves and Stoneley sonic waves.

Turning now to the drawings, the subject invention is directed to the concept of sonic measurements and systematically determining formation attributes of compressional, shear, and Stoneley slowness (DT) coherent energy (CE) and attenuation (ATT) and using the information on a real time basis to detect the presence of a gas zone or kick within a borehole.

Context of the Invention

FIG. 1 discloses a drilling derrick 100 positioned over a well hole 102 being drilled into an earth formation 104. The drilling derrick has the usual accompaniment of drilling equipment including a processor 106 and recorder 108 of the type used for measurements-while-drilling (MWD) or logging-while-drilling (LWD) operations. A more detailed disclosure of conventional drilling equipment of the type envisioned here is described in Schlumberger's Wu et al published application No. 2006/0120217 the disclosure of which is incorporated by reference as though set forth at length.

The borehole is formed by a drill string 110 carrying a drill bit 112 at its distal end. The drill bit crushes its way through earth formations as the drill string is rotated by drilling equipment within the drilling derrick. The depth of a well will vary but may be as much at 25,000 feet or more in depth.

Turning to FIGS. 2a-2c a quadrupole acoustic shear wave LWD tool segment 114 is shown in a degree of schematic detail. A more detailed discussion of a LWD tool of this type can be seen in Hsu et al. Publication No. US 2003/0058739 of common assignment with the subject application. The disclosure of this entire publication is incorporated by reference here. Briefly, however, the quadrupole LWD tool segment 114 includes at least one transmitter ring 200 and an array of receivers 212.

FIG. 2b illustrates a transmitter 200 divided into four quadrants 202, 204, 206 and 208. Each quadrant contains a quarter-circle array of piezoelectric transducer elements 210. FIG. 2B shows six piezoelectric transducer elements in each quadrant although in some embodiments nine elements may be preferred uniformly spaced around the azimuth.

As noted above an array of quadrupole receivers 212 is shown in FIG. 2a embedded within the side wall of drill pipe segment 114. These receivers are equally spaced vertically and may be ten to fifty or more in a vertical array. The receivers are similar to the transmitter in that each receiver 214 of receiver array 212 has a quarter circle of piezoelectric transducer elements in each of quadrants 216, 218, 220 and 222 as shown in FIG. 2c. Each ring transducer is capable of detecting a quadrupole shear wave refracted through a formation as discussed more fully in the above referenced Hsu et al publication US 2003/0058739.

While FIGS. 1-2 schematically disclose a LWD system where sonic transmitters and receivers are embedded within the side walls of a drill string near the drilling bit, FIG. 3 disclose a wireline tool or sonde 300 which is lowered down a borehole suspended by a wireline 302 following a drill string tripping operation or subsequent logging following drilling operations. The sonde carries a transmitter 304 and an array of receivers 306 similar to the LWD tool discussed in connection with FIGS. 1 and 2. In this, the transmitting component 304 sends sonic waves 308 into the surrounding earth formation 310 and compressional or "P" waves 312, shear or "S" waves 314 and Stoneley or tube waves 316 (that are propagated along the interface between a formation and the borehole fluid) are received by an array of the receiver components 306 as illustrated in FIGS. 2A-2C above.

Measurement of arrivals of these waveforms will show up in a slowness-time plane (STP) as prominent coherent peaks. The compressional, shear and Stoneley slowness (DTc, DTs and DTst) will be derived from the attributes of these coherent peaks. The subject invention expands the wave component attributes to include coherent energy (CE) and attenuation (ATT) which are useful in detecting the presence of formation gas and kick detection.

Waveform Attributes

FIG. 4 depicts a set of synthetic waveforms, as a function of time, as they appear to an array of receivers placed at equal intervals, 400 (RR), along the tool. The abscissa in FIG. 4 is the arrival time of sonic waves in micro seconds and the ordinate represents sonic receivers 1-12. (Equal spacing of receivers (RR) is not a requirement, although this assumption is made here to simplify calculations.) As FIG. 4 illustrates, the compressional 402, shear 404, and borehole (or Stoneley) 406 wave components generally appear at different times and, because the components differ in "slowness" (S), move out across the array at different rates.

A waveform arriving at time (T) at the first receiver will arrive at the nth receiver at time $(T)+(n-1)\cdot$(receiver spacing) $\cdot(S)$. The slowness-time-coherence (STC) method discussed in Kimball et al. *Geophysics*, above, is used to process the monopole wireline or LWD sonic waveform signals for coherent arrivals. This method systematically computes the coherence (C) of signals that start at the first receiver at time (T) and move out across the array at a rate corresponding to slowness (S). All of the coherent arrivals appear in the slowness-time plane (STP) as prominent coherent peaks. Estimates of compressional, shear, and Stoneley slowness (DTc, DTs, and DTst) are derived from the attributes of these coherent peaks.

For each coherent peak in the S/T plane, the slowness (S) and arrival time at the first receiver (T) are used to construct a time window over the array. One such time window is shown in FIG. 4. The time window is of the same length for each receiver, but, to account for the slowness (S) a time window that begins at time (T) for the first receiver will begin at time $(T)+(n-1)\cdot$(receiver spacing)$\cdot(S)$ for the nth receiver. The length of the window is the same as the (STC) computation window and consists of the number equally spaced points within a time window (nptw) at which the waveform is computed.

Let TR(k), k=1, 2, . . . , number of receivers (nrec) be the transmitter-to-receiver distance for the k-th receiver. Under the assumption of equal spacing, (RR), between adjacent receivers, $TR(k+1)-TR(k)=RR$, k=1, 2, . . . , nrec−1.

Let w(j,k), j=1, 2, . . . , (nptw), k=1, 2, . . . , (nrec) be the sampled waveform (at the "j"th sampling point and at the "k"th receiver) within the selected time window—"j" represents the time index, and "k" represents the receiver index.

Let hw(j,k) be the (discrete) Hilbert transform of w(j,k) in the time domain. The analytic representation of the signal, $w_a(j,k)$, is a complex signal defined in terms of w(j,k) and hw(j,k): $w_a(j,k)=w(j,k)+(i)\cdot(hw(j,k))$.

The proposed invention uses the framework described above of defining several attributes of the wave components found in the slowness-time plane (STP). In addition to slowness, time, and coherence, however, the subject invention demonstrates the utility of coherent energy and attenuation attributes to oil and gas drilling and production operations.

Coherent Energy Attribute

The wave component coherent energy attribute (CE) is computed for a given (S) and (T) in the (STP) by stacking the analytic signals across the array for a given time index "j", multiplying the result by its conjugate to get the square of the magnitude for each "j", and finally averaging over the time index "j". Specifically:

$$CE = \frac{1}{nptw}\sum_{j=1}^{nptw}\left\{\left[\frac{1}{nrec}\sum_{k=1}^{nrec}w_a(j,k)\right] \times conj\left[\frac{1}{nrec}\sum_{k=1}^{nrec}w_a(j,k)\right]\right\}$$

Attenuation Attribute

The wave component attenuation attribute (ATT) is computed for a given (S) and (T) in the (STP) by using a linear least square fit algorithm to determine how TE(k), the total energy within the time window for receiver "k", attenuates as a function of TR(k), the distance from the transmitter to the kth receiver.

The total energy within the time window for receiver "k", TE(k), is computed using the formula:

$$TE(k) = 10 \times \log_{10}\left[\sum_{j=1}^{nptw}\{[w_a(j,k)] \times conj[w_a(j,k)]\}\right], k = 1, 2, \ldots nrec$$

Here, TE(k) is in a log scale with unit of dB referenced to 1 Pascal.

For the set of real data pairs (TR(k), TE(k)), k=1, 2, . . . , nrec, an nth order least squares fit polynomial $Pn(x)=a_0+a_1x+ \ldots +a_nx^n$ can be constructed for n≤nrec−1. This polynomial will minimize:

$$\sum_{k=1}^{nrec}(P(TR(k)) - TE(k))^2$$

over all polynomials (P) of degree≤n.

The linear least square fit polynomial, $P_1(x)=a_0+a_1x$, is used here to determine the attenuation attribute. In particular, the negative value of the coefficient "$a_1$" (which is normally negative) will be defined as the attenuation (ATT).

In the general case of the nth order least square fit polynomial for the data set $\{(x_i, y_i), i=1, 2, \ldots, N\}$ where N≥n−1, the coefficient matrix (A) for the polynomial can be obtained from the data pairs by means of the matrix formula:

$$A=(X^TX)^{-1}X^TY \text{ where:}$$

$$A = \begin{bmatrix} a_0 \\ a_1 \\ \vdots \\ a_n \end{bmatrix}$$

$$X = \begin{bmatrix} 1 & x_1 & x_1^2 & \vdots & \vdots & x_1^n \\ 1 & x_2 & x_2^2 & \vdots & \vdots & x_2^n \\ \vdots & \vdots & \vdots & \vdots & \vdots & \vdots \\ 1 & x_N & x_N^2 & \vdots & \vdots & x_N^n \end{bmatrix}$$

$$Y = \begin{bmatrix} y_1 \\ y_2 \\ \vdots \\ y_N \end{bmatrix}$$

For the linear least square fit polynomial where n=1, this formula for the coefficients reduces to:

$$a_0 = \frac{\sum_{i=1}^{N} x_i^2 \sum_{i=1}^{N} y_i - \sum_{i=1}^{N} x_i \sum_{i=1}^{N} x_i y_i}{N \sum_{i=1}^{N} x_i^2 - \left(\sum_{i=1}^{N} x_i\right)^2}$$

and $$a_1 = \frac{N \sum_{i=1}^{N} x_i y_i - \sum_{i=1}^{N} x_i \sum_{i=1}^{N} y_i}{N \sum_{i=1}^{N} x_i^2 - \left(\sum_{i=1}^{N} x_i\right)^2}$$

For the particular application involving attenuation, as described above, N=nrec; $x_i$=TR(i), the distance between the transmitter and the "i"th receiver; and $y_i$=TE(i), the total energy at the "i"th receiver.

Where: (ATT), the attenuation,=$a_1$

Gas Zone Detection

Gas, even in trace amounts, affects certain wave components such as compressional waves and Stoneley waves. Accordingly, the attributes of the sonic wave components discussed above can be used to detect the presence of gas in the formation in real time.

When a drill bit penetrates a gas-bearing formation with unexpected high pressure (higher than the mud pressure), gas may seep into the well bore. The sonic tool, which may be 50 to 100 feet behind the drill bit, can provide the data needed to determine the attributes of the sonic wave components and can, therefore, provide a driller with near real-time detection of gas zones. This information will, for example, help the driller choose an appropriate mud weight so that the formation gas does not continually seep into the borehole. Alternatively, if the mud weight has to be lower for other drilling reasons, the driller could set pipe to protect the borehole from a gas zone.

Since gas will travel with the circulating mud uphole immediately, Stoneley (ST) waves, as detected by the sonic tool, will be affected by the presence of gas in the borehole well before the sonic tool reaches the gas zone. Thus, the attributes of the Stoneley waves may be the first indicators of gas in the formation. Gas, even a trace amount, is known to slow down and attenuate tremendously the Stoneley wave in the borehole over the sonic logging frequency range. The slowness (DT), coherent energy (CE), and the attenuation (ATT) attributes of the Stoneley wave components can be monitored as a function of depth to provide early detection of the presence of gas in a borehole.

The attributes of compressional (C) and shear (S) waves can also be used to detect the presence of gas. Like the Stoneley waves, compressional waves are known to slow down and attenuate tremendously in the presence of a small amount of gas. On the other hand, the slowness and attenuation of the shear wave changes relatively little in the presence of gas.

Figure 5A:
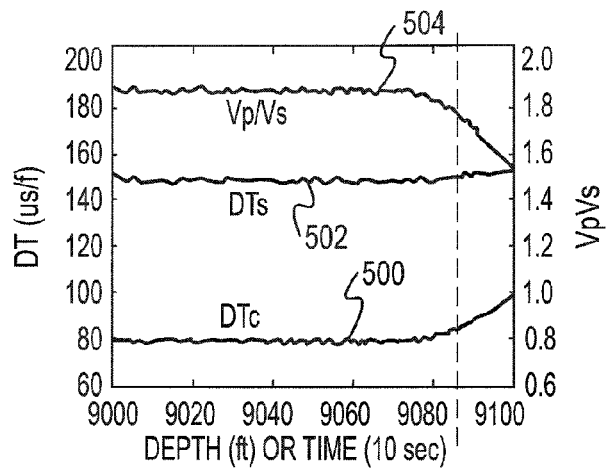
FIG. 5a is a graph depicting a combination of an increase in compressional slowness (DTc) along with a decline in compressional to shear velocity (Vp/Vs) indicative of the presence of gas.
Figure 5B:
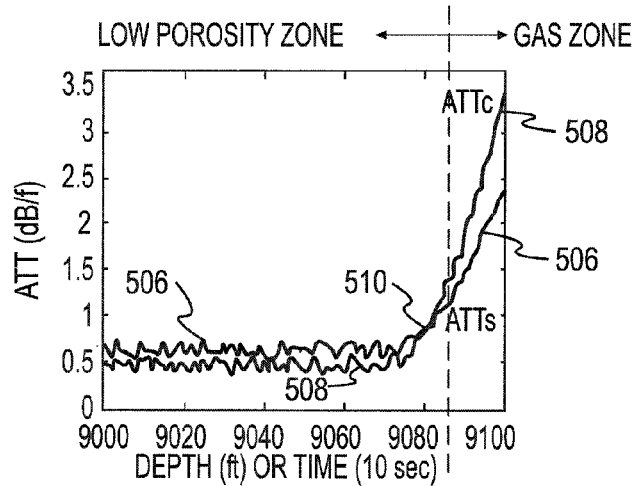
FIG. 5b is a graph depicting the pattern of compressional and shear attenuation (ATTc and ATTs) when a gas zone is encountered.
Figure 5C:
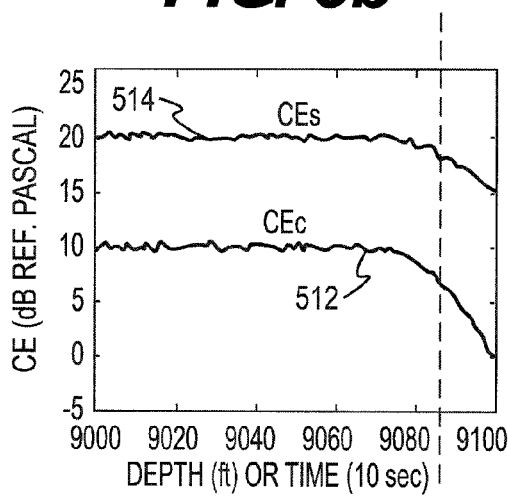
FIG. 5c is a graph showing a pattern of shear and compressional energy (CEs and CEc) indicative of when a driller is about entering into a gas bearing formation.

FIG. 5 illustrates how compressional and shear waveform attributes can be used to detect a gas zone. The three graphs in FIGS. 5a, 5b and 5c show how the different attributes (slowness, attenuation, and coherent energy) are affected by the presence of gas. The three patterns of variation can be used to corroborate each other in identifying the presence of gas.

In the gas zone, DTc 500 increases rapidly, while the change in DTs 502 is relatively minor (FIG. 5a). This results in a significant increase in the ratio DTc/DTs (or as shown in FIG. 5a a significant decrease in its reciprocal (Vp/Vs 504) decrease in the compressional to shear velocity as the tool moves down the hole. If DTc increases due to lithology changes, as opposed to the presence of gas, Dts will also increase and the velocity ratio Vp/Vs is also likely to increase.

Normally, in formations without gas, the attenuation associated with shear waves, (ATTs) 506, is slightly higher than the attenuation associated with compressional waves, (ATTc) 508 (FIG. 5b). Gas causes ATTc to increase more rapidly than ATTs, resulting in a crossover of the two curves—note point 510 in FIG. 5b and the ratio ATTc/ATTs will increase.

The coherent energy attribute of compressional waves, (CEc) 512, will also show a much greater rate of decrease than the coherent energy attribute of shear waves, (CEs) 514 (see FIG. 5c) in the presence of gas. Thus the ration CEC/CES will decrease.

Data from the compressional and shear wave attributes as a function of depth or time, as depicted in FIGS. 5a-5c, can be used to set a trigger level or gas zone flag that is sent uphole to warn the driller of entry into a gas bearing formation. As an example, an alert could be triggered when the baseline Vp/Vs ratio decreases below a certain value. Increases in (DTc) and behavior of DTc/DTs, ATTc, ATTs, ATTc/ATTs, CEc, CEs and CEc/CEs, consistent with FIGS. 5a-5c, could be used to substantiate the presence of gas.

Kick Detection

A sudden infusion of fluid or gas within a borehole is known as kick. Stoneley wave attributes (DTst, ATTst, and CEst) are particularly sensitive indicators for the presence of gas in the well bore. Accordingly they can be used on a real time basis as incipient kick indicators to provide a driller with valuable reaction time for safe drilling of a well. The added reaction time provided by the Stoneley wave attributes, as opposed to compressional and shear wave attributes, may significantly increase drilling safety.

The Stoneley slowness (DTst), attenuation (ATTst), and amplitude (CEst) are functions of the mud and formation properties. When drilling through formations of the same lithology, the variation in these Stoneley wave attributes are sensitive indicators of kick of gas or formation fluid. Normally, these attributes will be very slowly changing variables within a given zone of the same lithology. Their baseline values, as a function of time or well depth, which can be established by other LWD measurement techniques such as gamma ray (GR), sonic delta-t, resistivity and nuclear tools. Any abrupt changes in the attributes may signify the possible influx of gas or formation fluids and will, therefore, trigger a warning flag.

Figure 6A:
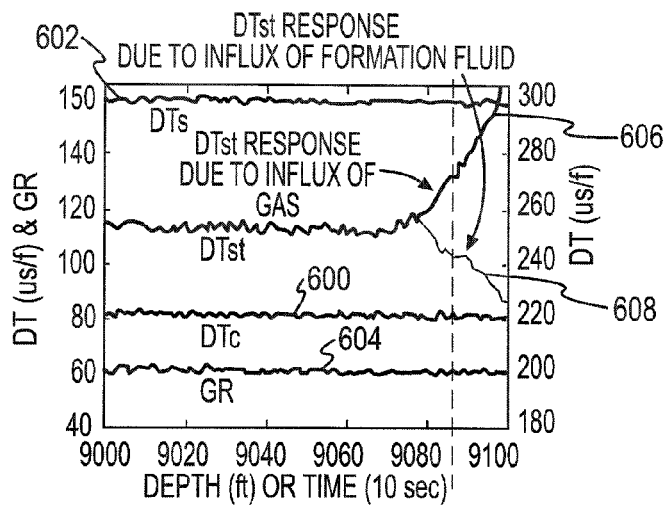
FIG. 6a is a graph illustrating the effect on Stoneley slowness (DTst) of the influx of gas in a well bore.
Figure 6B:
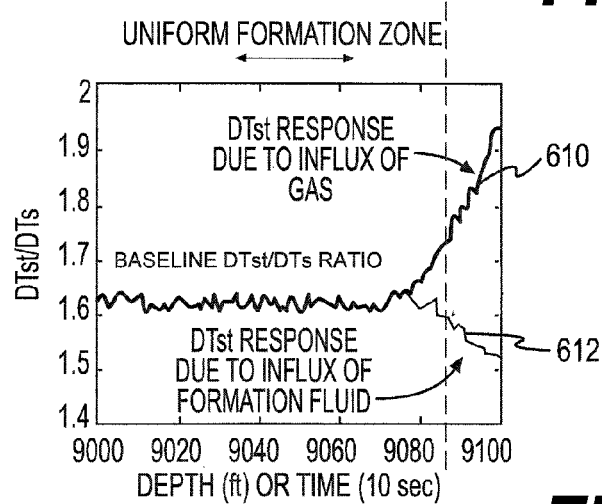
FIG. 6b is a graphic illustration of the effect on a ratio of Stoneley slowness (DTst) to shear slowness (DTs) due to an influx of gas within a borehole.
Figure 6C:
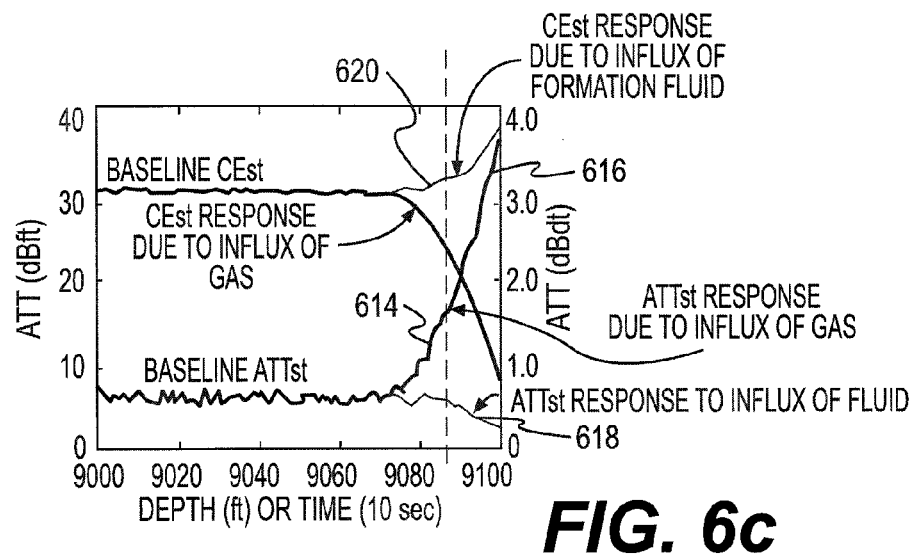
FIG. 6c is a graph showing a baseline Stoneley coherent energy (CEst) and a baseline Stoneley attenuation (ATTst) and the effect due to an influx of gas useful for kick detection.

FIGS. 6a-6c illustrate how Stoneley wave attributes can be used to construct a kick warning flag. In FIG. 6a, the lithology of the zone of interest is shown to be essentially uniform, as verified by sonic delta-t logs (DTc 600 and DTs 602) and (GR 604) logs. These logs are controlled primarily by properties of the formation, while the Stoneley wave slowness, (DTst), is also sensitive to the borehole and mud properties. A sudden change in (DTst) in the uniform formation zone of FIG. 6a usually implies significant influx of gas or formation fluid. An influx of gas will cause (DTst) to increase drastically (note 606 in FIG. 6a) while an influx of connate water will usually cause (DTst) to decrease somewhat (note 608 in FIG. 6a).

In order to detect a sudden change in Stoneley slowness due to an influx of gas or fluid, it may be advantageous to monitor the ratio (DTst/DTs), which can normalize some variation in (DTst) due to changes in the properties of the formation. FIG. 6b depicts an increase of the ratio (DTst/DTs) 610 as compared with its baseline ratio, which is due to an influx gas. FIG. 6b also depicts a decrease of the ratio (DTst/DTs) 612 as compared with its baseline, which is due an influx in formation fluid. It suggests that a trigger level for this ratio would be typically a certain fractional increase or decrease relative to the baseline of the (DTst/DTs) ratio.

FIG. 6c shows that an influx of gas will result in a significant increase in (ATTst) 614, while (CEst) 616 will experience a rapid decrease. An influx of fluid will usually cause (ATTst) to decrease slightly (note 618), while (CEst) may increase somewhat (note 620). (ATTst) and (CEst) can, therefore, provide corroboration to a warning triggered by changes in the (DTst/DTs) ratio.

Figure 7:
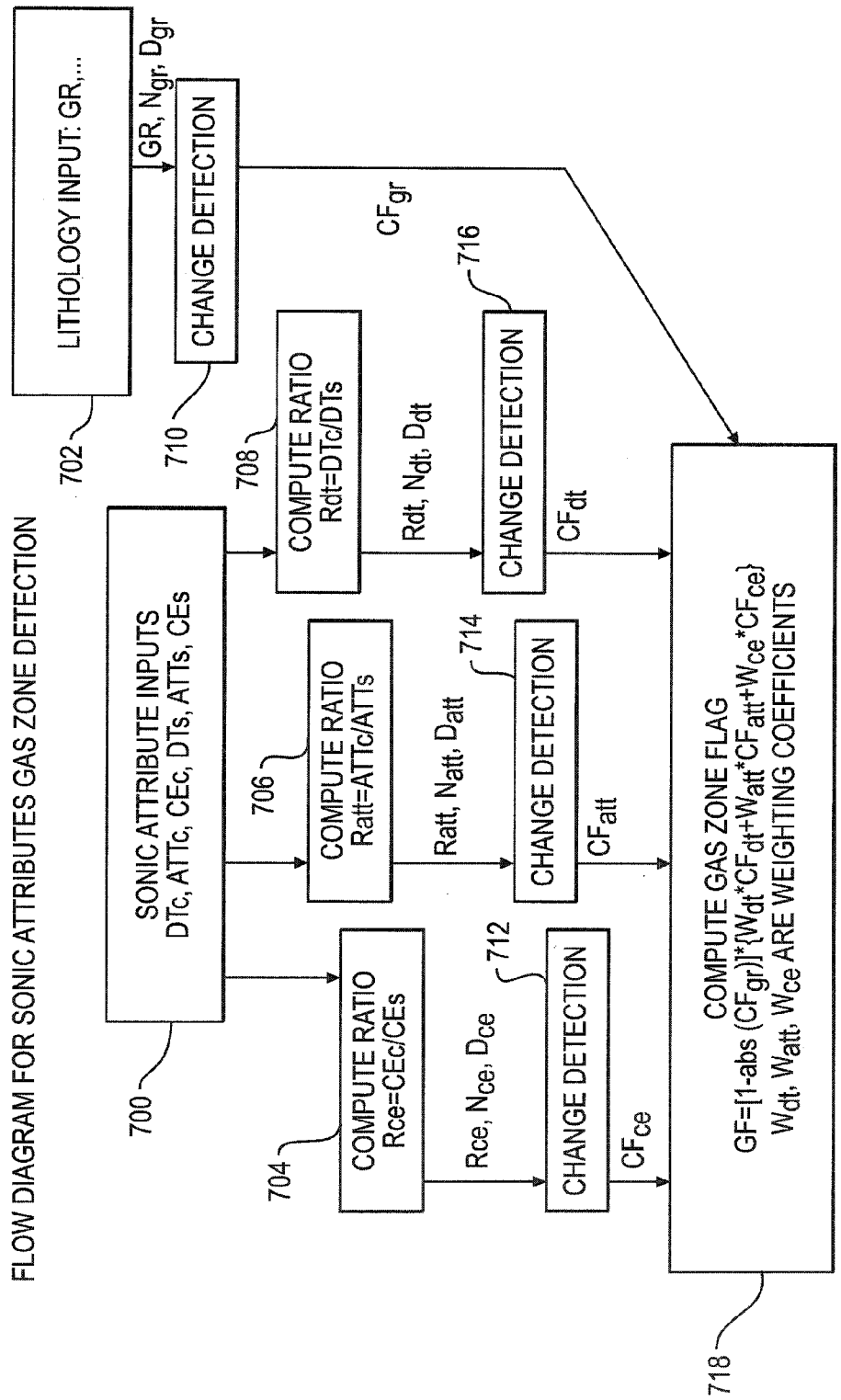
FIG. 7 is an illustrative flow diagram for gas zone detection in accordance with one embodiment of the subject invention.

Change detection logic can be used to set change flags (CFs) based on a given type of input that is continually generated as a tool proceeds down the borehole. FIGS. 7 and 9 are illustrative diagrams, based on the change detection logic described here, for gas zone detection and kick detection, respectively. Input used in the illustrative charts include:
Gamma Ray measurement (GR)
Coherent Energy ratio for compressional and shear waves ($R_{CE}$)
Attenuation ratio for compressional and shear waves ($R_{ATT}$)
Slowness ratio for compressional and shear waves ($R_{DT}$)
Coherent Energy for Stoneley waves ($C_{EST}$)
Attenuation for Stoneley waves ($ATT_{ST}$)
Slowness for Stoneley Waves ($DT_{ST}$)

The inputs involving compressional and shear waves are primarily useful in formation gas zone detection while the inputs involving Stoneley waves are primarily useful in kick detection. Gamma ray measurements could be used in both gas zone and kick detection, but are most useful in gas zone detection, since the Stoneley waves reacts almost immediately to a small amount of gas released to the borehole fluid at the bit. The gamma ray input will be particularly helpful for kick detection if the gamma ray sonde is very near or inside the bit.

A Change Flag for a given type of input can take on the values 1, −1, or 0, corresponding, respectively, to the input exhibiting a large increment, a large decrement, or no change, relative to previous measurements. A driller needs to determine how much past data is stored for comparison and how large an increment or decrement over earlier data is required to assign the flag a value of 1 or −1.

If (N) represents the (user-chosen) amount of previous input data that is maintained for comparison. The most recent (N) inputs are placed in a buffer that maintains a running average (M)—the most recent (N) inputs are added and the result is divided by (N) to determine (M) at any given time. In the start-up period when the buffer is not full, (M) will be the average over the inputs that have been recorded.

A driller chosen number (D) represents the number that will be used to determine if a significant change has occurred. The most recent input (X) is compared with (M), the running average in the buffer. If (X−M>D), (CF) is set to 1 indicating a large increment in the particular input data. If (X−M<−D), (CF) is set to −1 indicating a large decrement in the particular input data. If |X−M|≤(D), (CF) is set to 0 indicating no significant change in the input data.

The (N) and (D) will likely be different for the different kinds of input and thus are subscripted as ($N_{in}$) and ($D_{in}$) for generic index in.

Flow Diagram for Attributes Gas Zone Detection

In FIG. 7 gas zone detection flags are used to detect gas-containing formations in the vicinity (~100 feet behind the bit) of the sonic tool. The gas in the formation may or may not seep out into the well bore depending on the mud weight and the bottom hole pressure. Thus, Stoneley or borehole waves may not provide instantaneous detection at the tool. Thus, this flow diagram exploits the changes—particular the relative changes—in coherent energy (CE), attenuation (ATT) and slowness (DT) of the compressional and shear waves to the presence of gas in the formation.

Unfortunately, the responses of the compressional and shear waves also vary with lithology or rock type. Lithology change is reflected independently using gamma ray measurement and this measurement is used to minimize false alarms triggered by changes in the compressional and shear waves due to lithology.

Change detection, as described in the "Change Detection Logic" discussed above, relies on the following input data and derived ratios:
Gamma Ray measurement (GR)—box 702;
Coherent Energy ratio for compressional and shear waves ($R_{CE}$=CEc/CEs)—boxes 700 and 704;
Attenuation ratio for compressional and shear waves ($R_{ATT}$=ATTc/ATTs) boxes 700 and 706; and
Slowness ratio for compressional and shear waves ($R_{DT}$=DTc/DTs) boxes 700 and 708.

Each of the four types of input has its own selected (N) (number of retained data points or the size of the data buffer) and (D) (the difference between the buffer average (M) and the most recent input data that will trigger a change flag for the type of input). The change flags (CFs) for the four types of input (each with value 1, −1, or 0) 710, 712, 714 and 716 are used to compute the value of the Gas Zone Flag 718, which may then trigger a response by the driller to suspected gas in the formation. The computation of this value may also involve driller-supplied weights. To get a correct result, the weights assigned to the flags for the slowness and attenuation ratios ($R_{DT}$ and $R_{ATT}$) will be positive, and the weight assigned to the flag for the coherent energy ratio ($R_{CE}$) will be negative. The flag associated with gamma ray measurement may be incorporated as a separate term or a factor of the form: [1−abs ($CF_{GR}$)] in order to help eliminate setting a gas flag when changes are due to lithology.

The Gas zone Flag (GF) in FIG. 7 behaves like a switch on state change indicator. If the attributes respond to the onset of gas, GF would be expected to increase from zero to a positive value depending on the weighting factors and the number of corresponding indicators. If the attributes remain unchanged, there will be no change in GF, whether gas is present or not present. If the sonic tool moves away from a gas zone, GF would take on a negative value signifying the disappearance of gas.

The Gas Flag (GF) should be used in conjunction with a gas response indicator (GRI) which may be a combination of the basic attributes. The following are some examples of GRI that will have higher values in a gas zone.

GRI=ATTc/ATTs*DTc/DTs*CEs/CEc

GRI=(DTc*ATTc)/CEc

GRI=Att*ATTc/ATTs+Wdt*DTc/DTs+Wce*CEs/CEc where Watt, Wdt and Wce are nonnegative weighting coefficients.

Figure 8:
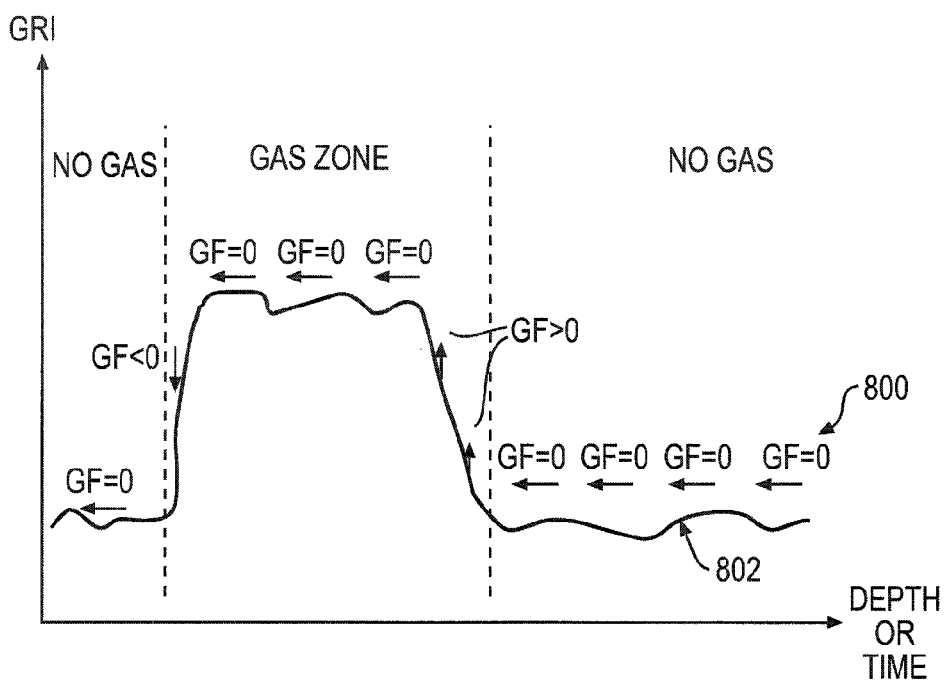
FIG. 8 is an illustration of Gas Response Indicator (GRI) and Gas Flag (GF) as a function of Depth or Time for gas zone detection.

FIG. 8 illustrates the relationship between the Gas Flag 800 (GF) which is a state change indicator and Gas Response Indicator (GRI) 802 which takes on larger values when gas is present than when it is absent. The two indicators would be used in combination to inform the decision maker of the presence of a gas zone.

Flow Diagram for Sonic Attributes Kick Detection

In FIG. 9 kick detection flags are used to detect a small amount of gas released to the borehole fluid from the formation at the bit and, therefore, provide early warning time to a driller. Stoneley or borehole waves, which exhibit predictable changes in coherent energy, attenuation and slowness in this situation, provide the primary method of detection.

Change detection, as described in the "Change Detection Logic" above, uses the following input data:
Gamma Ray measurement (GR)—box 900;
Coherent Energy for Stoneley waves ($CE_{ST}$)—box 902;
Attenuation for Stoneley waves ($ATT_{ST}$)—box 902; and
Slowness for Stoneley Waves ($DT_{ST}$)—box 902.

Each of the four types of input has its own selected (N) (number of retained data points or the size of the data buffer) and (D) (the difference between the buffer average (M) and the most recent input data that will trigger a change flag for the type of input). The change flags (CFs) for the four types of input (each with value 1, −1, or 0) 904, 906, 908 and 910 are used to compute the value of a Kick Detection Flag 912, which may then trigger a response by the driller to suspected gas at the drill bit. The computation of this value will probably involve driller-supplied weights. To get the correct result, the weights assigned to the flags for Stoneley slowness and attenuation (DTst and ATTst) will be positive, and the weight assigned to the flag for the coherent energy (CEst) will be negative. A flag associated with gamma ray measurement may be incorporated as a separate term or a factor of the form: [1−abs ($CF_{GR}$)] if the gamma ray sonde is very near the drill bit.

The Kick detection Flag (KF) in FIG. 9 behaves like a switch or state change indicator. As with the Gas zone Flag (GF) in FIG. 7, this flag should be used in conjunction with a Gas Response Indicator (GRI). In this case, some examples of a GRI based on the attributes of Stoneley or borehole waves are:

$$GRI=(ATTst*DTst)/CEst$$

$$GRI=Watt*ATTst+Wdt*DTst+Wce/CEst$$

where Watt, Wdt and Wce are nonnegative weighting coefficients.

Figure 10:
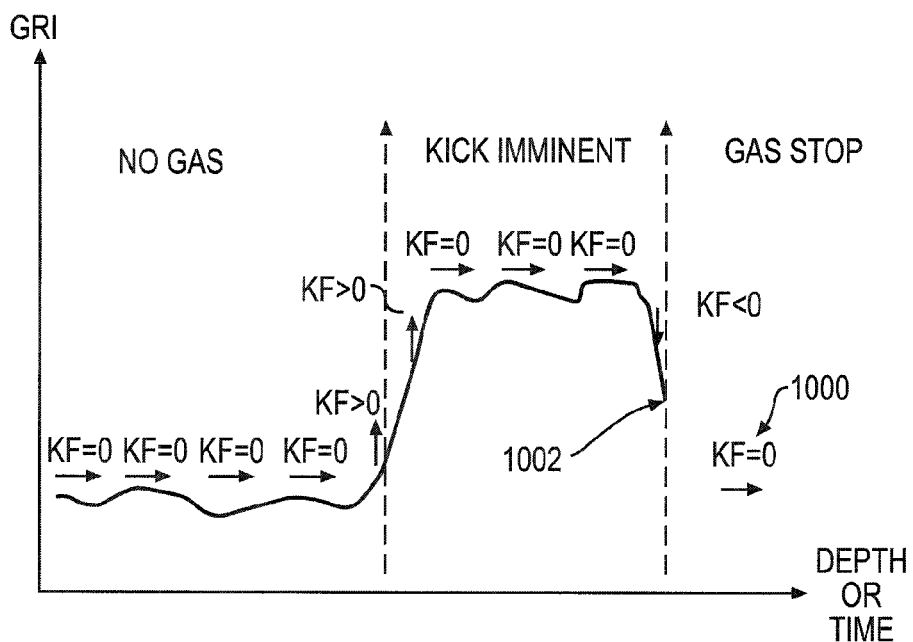
FIG. 10 is an illustration of Gas Response Indicator (GRI) and Kick Flag (KF) as a function of depth or time to provide warning of an imminent gas kick event.

FIG. 10 illustrates the relationship between the Kick detection Flag (KF) 1000 and the Gas Response Indicator) GRI 1002, which takes on larger values when kick is imminent. The two indicators are used in combination to inform a driller of the possibility of a kick event.

The various aspects of the invention were chosen and described in order to best explain principles of the invention and its practical applications. The preceding description is intended to enable those of skill in the art to best utilize the invention in various embodiments and aspects and with modifications as are suited to the particular use contemplated. It is intended that the scope of the invention be defined by the following claims.

What is claimed is:

1. A method for determining the presence of a formation gas zone during a well logging operation by monitoring sonic waveform signals for coherent arrivals comprising:
    emitting periodic sonic wave energy toward a borehole formation by a well logging system in a borehole;
    receiving compressional wave signals refracted from the formation from said periodically emitted sonic waves;
    receiving shear wave signals refracted from the formation from said periodically emitted sonic waves;
    determining compressional slowness (DTc) from attributes of received coherent compression signal peaks;
    determining shear slowness (DTs) from attributes of received coherent shear signal peaks;
    determining a compressional wave attenuation attribute (ATTc);
    determining a shear wave attenuation attribute (ATTs);
    determining a compressional wave coherent energy attribute (CEc);
    determining a shear wave coherent energy attribute (CEs);
    detecting zones of rock formation containing gas in logging while drilling time using combinations of logging while drilling sonic attributes DTc/DTs, ATTc/ATTs, and CEc/CEs to form a gas zone flag; and
    detecting presence of gas in the borehole in logging while drilling time using combinations of logging while drilling sonic attributes of borehole Stoneley waves DTst, ATTst, and CEst to form a gas kick flag.

2. A method for determining the presence of a formation gas zone in a well logging operation as defined in claim 1 and further comprising:
    affirming the presence of a gas zone by noting a decrease in compressional coherent energy attribute (CEc) and a decrease in shear wave coherent energy attribute (CEs) where the decrease in compressional coherent energy attribute (CEc) is greater than the decrease in the shear coherent energy attribute (CEs).

3. A method for determining the presence of a formation gas zone in a well logging operation as defined in claim 2 and further comprising:
    setting the gas zone flag in the event the detected change in the combination of (DTc/DTs), (ATTc/ATTs) and (CEc/CEs) exceed a set value.

4. A method for determining the presence of a formation gas zone in a well logging operation as defined in claim 3 and further comprising:
    assigning a weighting factor to each of the factors of (DTc/DTs), (Attc/ATTs) and (CEc/CEs) before setting the gas zone flag.

5. A method for determining the presence of a formation gas zone in a well logging operation as defined in claim 1 and further comprising:
    setting the gas zone flag in the event the detected change in (DTc/DTs) exceeds a set value.

6. A method for determining the presence of a formation gas zone in a well logging operation by monitoring sonic waveform signals for coherent arrivals comprising:
    emitting periodic sonic wave energy toward a borehole formation;
    receiving compressional wave signals refracted from the formation from said periodically emitted sonic waves;
    receiving shear wave signals refracted from the formation from said periodically emitted sonic waves;
    determining a compressional wave attenuation attribute (ATTc);
    determining a shear wave attenuation attribute (ATTs);
    determining compressional slowness (DTc);
    determining shear slowness (DTs);
    determining a compressional wave coherent energy attribute (CEc);
    determining a shear wave coherent energy attribute (CEs); and
    detecting zones of rock formation containing gas in logging while drilling time using combinations of logging while drilling sonic attributes DTc/DTs, ATTc/ATTs, and CEc/CEs to form a gas zone flag.

7. A method for determining the presence of a formation gas zone in a well logging operation as defined in claim 6 and further comprising:

affirming the presence of a gas zone by noting a decrease in compressional coherent energy attribute (CEc) and a decrease in shear coherent energy attribute (CEs) where the decrease in compressional coherent energy attribute (CEc) is greater than the decrease in the shear coherent energy attribute (CEs).

8. A method for determining the presence of a formation gas zone in a well logging operation as defined in claim 7 and further comprising:

setting the gas zone flag in the event the detected change in (CEc/CEs) exceeds a set value.

9. A method for determining the presence of a formation gas zone in a well logging operation as defined in claim 6 and further comprising:

setting the gas zone flag in the event the detected change in (ATTc/ATTs) exceeds a set value.

10. A method of determining the presence of formation gas on a real time basis during a logging while drilling process, comprising:

determining inputs of formations during the logging while drilling process;

determining a baseline and a change flag based on the inputs;

using a logging while drilling tool to emit sonic waves toward a formation;

receiving waveform signals from the sonic waves refracted from the formation by using the logging while drilling tool;

processing the waveform signals to obtain sonic attributes, wherein the sonic attributes are selected from the group consisting of wave component slowness attribute, wave component coherent energy attribute, and wave component attenuation attribute associated with the waveform signals;

computing sonic attribute ratios from the sonic attributes;

determining a plurality of sonic attribute ratio baselines and a plurality of sonic attribute ratio change flags based on the sonic attribute ratios; and detecting zones of rock formation containing gas in logging while drilling time using combinations of logging while drilling sonic attributes DTc/DTs, ATTc/ATTs, and CEc/CEs to form a gas zone flag.

11. A method of determining the presence of formation gas on a real time basis during a logging while drilling process, comprising:

determining inputs of formations during the logging while drilling process;

determining a baseline and a change flag based on the inputs;

using a logging while drilling tool to emit sonic waves in a borehole;

receiving waveform signals from the sonic waves transmitted within the borehole by using the logging while drilling tool;

processing the waveform signals to obtain sonic attributes, wherein the sonic attributes are selected from the group consisting of wave component slowness attribute, wave component coherent energy attribute, and wave component attenuation attribute associated with the waveform signals;

determining a plurality of attribute baselines and a plurality of sonic attribute change flags based on the sonic attributes; and detecting presence of gas in the borehole in logging while drilling time using combinations of logging while drilling sonic attributes of borehole Stoneley waves DTst, ATTst, and CEst to form a gas kick flag.

* * * * *